United States Patent [19]
Nakabayashi

[11] Patent Number: 5,822,322
[45] Date of Patent: Oct. 13, 1998

[54] ATM PROTOCOL PROCESSING METHOD AND ATM PROTOCOL PROCESSING APPARATUS

[75] Inventor: Takeo Nakabayashi, Tokyo, Japan

[73] Assignee: Mitsubishi Denki Kabushiki Kaisha, Tokyo, Japan

[21] Appl. No.: 719,566

[22] Filed: Sep. 25, 1996

[30] Foreign Application Priority Data

Apr. 18, 1996  [JP]  Japan .................................. 8-096396

[51] Int. Cl.$^6$ ............................................ H04J 3/24
[52] U.S. Cl. ................................ 370/474; 370/252
[58] Field of Search ................... 370/395, 389, 370/396, 365, 466, 488, 470, 472, 476, 477, 474, 252, 253, 428, 412, 465, 468, 471, 905, 902

[56] References Cited

U.S. PATENT DOCUMENTS 5,117,417  5/1992  Danner .................................. 370/252
5,640,399  6/1997  Rostoker et al. ........................ 370/392
5,654,962  8/1997  Rostoker et al. ........................ 370/395

FOREIGN PATENT DOCUMENTS 5-83287    4/1993  Japan .
7-50669    2/1995  Japan .
7-253936  10/1995  Japan .

*Primary Examiner*—Dang Ton
*Attorney, Agent, or Firm*—Oblon, Spivak, McClelland, Maier & Neustadt, P.C.

[57] ABSTRACT

In order to implement RT and UPC, an information pair of prev and status is stored in a memory (2) every connection. For example, prev ($20_i$) and status ($21_i$) are stored in a connection performing frame reassembly in an i-th region ($30_i$). A first operation is adapted to store prev and status every time a cell is received. A second operation is adapted to read prev and status every time a timer (11) is up. A third operation is adapted to compare an elapsed time after receiving of the cell with an RT value.

20 Claims, 20 Drawing Sheets

F I G. 20
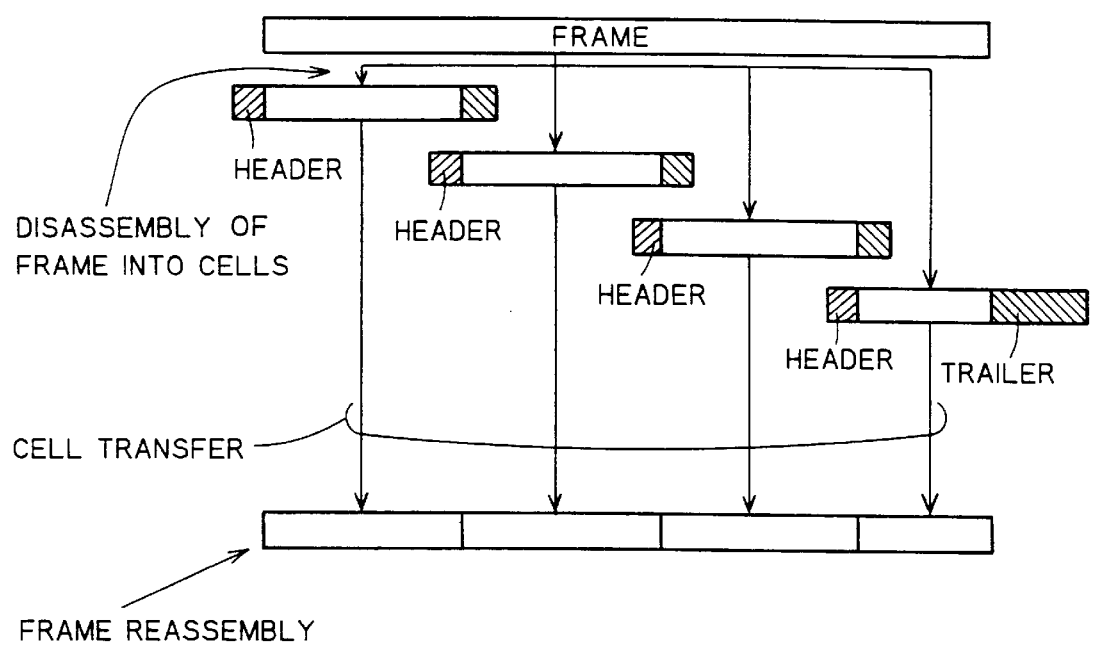

ATM PROTOCOL PROCESSING METHOD AND ATM PROTOCOL PROCESSING APPARATUS

BACKGROUND OF THE INVENTION

1. Field of the Invention

The present invention relates to a technique of performing protocol processing of an asynchronous transfer mode) hereinafter referred to as "ATM mode"), and more particularly, it relates to a reassembly timer (hereinafter referred to as "RT") and usage parameter control (hereinafter referred to as "UPC").

2. Description of the Background Art

In communication through the ATM, transferred data is disassembled into a plurality of blocks called cells having fixed lengths, so that the cells are transmitted and received. FIG. 19 is a conceptual diagram showing the format of each cell. Each cell is formed by 53 octets (1 octet=8 bits), and a header of five octets is prefixed to a payload of 48 octets. The content of the data to be transferred is arranged in the payload region.

A transmitter disassembles a frame, which is a block of data to be transferred, into sizes matched with payloads of cells and successively transmits the same. A receiver performs reassembly processing (frame reassembly) with the received cells, to regenerate the original frame.

FIG. 20 is a conceptual diagram showing a state of reassembling a frame from a plurality of cells. Headers (and trailers) are removed to obtain a frame.

In such frame reassembly, a memory provided in the receiver is employed in general. The receiver ensures a certain region of the memory provided therein, and successively writes received cells in the region, thereby executing frame reassembly. When a frame is reassembled and moved or processed, the region of the memory which has stored the cells forming the frame is released.

In a communication system employing the ATM, a plurality of communication paths (connections) can physically exist on the same transmission path at the same time. A terminal intending to newly perform communication, i.e., that requiring setting of a new connection, makes an application as to what characteristic of communication is employed to the communication network. When the request for setting a new connection is received, the communication network checks the current communication conditions, and allows the setting of this connection if possible.

In the aforementioned communication employing the ATM, there is a possibility for various errors. As concrete examples, such errors include, loss of cells, a trouble of the transmission path, or a trouble of the apparatus itself is predicted.

When the final cell of a certain frame is lost during transfer of the frame, for example, information indicating the end of the frame cannot be received. Therefore, frame reassembly cannot be completed, and it results to that the memory employed for this frame reassembly continuously holds already transferred ones of the cells belonging the frame, i.e., forming the frame. This leads to such a first problem that an unreleased region results in the memory to reduce the free capacity.

Further, the band available for the overall communication network has an upper limit. Therefore, if the newly allowed connection is inadequately used such that the communication is made in a band wider than the allowed one, for example, this leads to such a second problem that a bad influence may be exerted on communications in the remaining connections.

SUMMARY OF THE INVENTION

According to a first aspect of the present invention, an ATM protocol processing method, with existence of a plurality of connections for transmitting cells which are obtained by disassembly of a frame for conducting restoration of the frame by reassembly processing employing the cells, comprises steps of (a) being carried out every receiving of the cells, including a step of (a-1) storing the current time in a first parameter related to an unrestored connection not yet completing the restoration with the received cells among receiving connections which are the connections transmitting the received cells, (b) being carried out every first cycle, including a step of (b-1) obtaining a first elapsed time by subtracting the value of the first parameter from the current time at least every unrestored connection, and (c) comparing the first elapsed time with a second cycle which is longer than the first cycle.

According to a second aspect of the present invention, the steps (a) further includes a step of (a-2) storing information indicating whether or not the restoration is completed with the received cells as a second parameter which is related to the receiving connections, and the step (b) further includes a step of (b-2) obtaining the second parameters of all connections.

According to a third aspect of the present invention, the first and second parameters are stored in the same position in a memory every connection.

According to a fourth aspect of the present invention, a second parameter forming an information pair along with the first parameter every connection is set, the second parameter of one unrestored connection indicates the position of a storage region of the information pair of another unrestored connection, whereby the information pairs are coupled with each other for forming a linked list, and the step (b-1) is executed along the linked list every unrestored connection in the step (b).

According to a fifth aspect of the present invention, the step (a) further includes a step of (a-2) updating indicative information having indicated the storage region of the information pair of a new restored connection which is the receiving connection completing the restoration with the received cells, with the second parameter of the new restored connection.

According to a sixth aspect of the present invention, the step (a) further includes a step of (a-3) conducting an addition of a new unrestored connection which is the receiving connection newly becoming the unrestored connection to the linked list, for updating the second parameter of an information pair having been the end of the linked list precedently to the addition with the position of the information pair which is related to the new unrestored connection.

According to a seventh aspect of the present invention, the method further comprises a step of (c) being carried out every receiving of the cells, including steps of (c-1) reading the first parameter having been stored in relation to the receiving connections, (c-2) obtaining a second elapsed time by subtracting the first parameter from the current time, and (c-3) determining whether or not the second elapsed time is within a prescribed range, and the step (a-1) is carried out after the step (c).

According to an eighth aspect of the present invention, the step (c-3) is adapted to determine whether or not the second elapsed time is larger than the minimum time which is allowed for an interval between two cells adjacently transmitted in the receiving connections.

According to a ninth aspect of the present invention, the minimum time after a specific time is set while fluctuating in response to the interval between the cells which are transmitted in advance of the specific time in the connections.

According to a tenth aspect of the present invention, a value of the first parameter is increased by an amount defining the prescribed range in place of storing the current time in the first parameter in the step (a-1) when the second elapsed time is determined as not being within the prescribed range at the step (c-3).

According to an eleventh aspect of the present invention, an ATM protocol processing apparatus, with existence of a plurality of connections for transmitting cells which are obtained by disassembly of a frame for conducting restoration of the frame by reassembly processing employing the cells, comprises (a) a memory for storing first and second parameters every connection, (b) a clock device for supplying the current time, (c) a timer for supplying a first cycle, (d) a subtraction device for subtracting a value of the first parameter of the corresponding connection from the current time for obtaining an elapsed time every connection when the restoration in the connection is not completed, and (e) a comparison device for comparing the elapsed time with a second cycle which is longer than the first cycle, and the first parameter related to a receiving connection which is the connection transmitting the received cells is updated with the current time obtained from the clock device every receiving of the cells, while the second parameter related to the receiving connection is updated with information indicating whether or not the restoration is completed in the receiving connection every receiving of the cells.

According to a twelfth aspect of the present invention, the memory stores the first and second parameters in the same address every connection.

According to a thirteenth aspect of the present invention, an ATM protocol apparatus, with existence of a plurality of connections for transmitting cells which are obtained by disassembly of a frame for conducting restoration of the frame by reassembly processing employing the cells, comprises (a) a memory for storing first and second parameters every connection, (b) a clock device supplying the current time, (c) a timer supplying a first cycle, (d) storage means for storing head and end addresses of a linked list formed by unrestored connections which are the connections not completing the restoration, (e) a subtraction device for subtracting a value of the first parameter related to the unrestored connections from the current time for obtaining an elapsed time every connection, and (f) a comparison device for comparing the elapsed time with a second cycle which is longer than the first cycle, and the first parameter related to a receiving connection which is the connection transmitting the received cells is updated every receiving of the cells with the current time obtained from the clock device, the elapsed time is obtained along the linked list from the head address to the end address, while the linked list is formed by the second parameter of one unrestored connection indicating the position of a region for storing information related to another unrestored connection in the memory.

According to a fourteenth aspect of the present invention, the memory further stores a third parameter indicating a preferable receiving interval between the cells belonging to the same frame every connection, and the ATM protocol processing apparatus further comprises a second comparison device for comparing the elapsed time with the third parameter.

According to a fifteenth aspect of the present invention, the memory further stores a third parameter indicating a preferable receiving interval of the cells belonging to the same frame every connection, and a fourth parameter indicating a range which is allowed as to the receiving interval, and the ATM protocol processing apparatus further comprises a second comparison device for comparing the elapsed time with the difference between and the sum of the third and fourth parameters.

In the ATM protocol processing method according to the first aspect of the present invention, a determination is made as to whether or not a time required for restoring the frame exceeds the second cycle every first cycle, whereby the range of determination errors can be narrowed by reducing the first cycle.

In the ATM protocol processing method according to the second aspect of the present invention, the determination as to whether or not restoration of the frame related to the connection is completed in the step (b) can be performed with the second parameter of the corresponding connection.

In the ATM protocol processing method according to the third aspect of the present invention, the bands required for RT can be halved by halving the number of access times to the memory.

In the ATM protocol processing method according to the fourth aspect of the present invention, the first elapsed time is obtained only in relation to the connection not completing frame restoration. Therefore, the number of access times necessary for the memory storing the first parameter can be reduced, and the bands required in relation to RT can be reduced.

In the ATM protocol processing method according to the fifth aspect of the present invention, the information pair related to the connection completing frame restoration can be excluded from the linked list.

In the ATM protocol processing method according to the sixth aspect of the present invention, the connection starting frame reassembly and not completing restoration can be added to the end of the linked list.

In the ATM protocol processing method according to the seventh aspect of the present invention, it is possible to check whether or not the cells adjacently transmitted in the same connection are transmitted at a prescribed interval.

In the ATM protocol processing method according to the eighth aspect of the present invention, it results to that the connection transmitting the cells at an interval smaller than the minimum time is out of the allowed band. Therefore, a bad influence on other connections present in a communication network can be avoided by detecting such a connection.

In the ATM protocol processing method according to the ninth aspect of the present invention, it is possible to check the band of a connection whose characteristics are changed with time.

In the ATM protocol processing method according to the tenth aspect of the present invention, it is possible to avoid an erroneous determination of a timing for transmitting subsequent cells resulting from the prescribed range.

In the ATM protocol processing apparatus according to the eleventh aspect of the present invention, it is possible to implement the ATM protocol processing method according to the first aspect.

In the ATM protocol processing apparatus according to the twelfth aspect of the present invention, it is possible to implement the ATM protocol processing method according to the second aspect.

In the ATM protocol processing apparatus according to the thirteenth aspect of the present invention, it is possible to implement the ATM protocol processing method according to the fourth aspect.

In the ATM protocol processing apparatus according to each of the fourteenth and fifteenth aspects of the present invention, it is possible to implement the ATM protocol processing method according to the seventh aspect.

Accordingly, an object of the present invention is to provide a technique (technique of implementing RT) for shifting to error processing when no cell is received after a lapse of a constant time during frame reassembly, and a technique (a technique of implementing UPC) for monitoring operating states such as use conditions of bands in respective connections in addition thereto.

Application of RT is defined as an option in recommendation I.363 of ITU (International Telecommunication Union).

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a conceptual diagram showing a state of reassembling a frame from cells.

DESCRIPTION OF THE PREFERRED EMBODIMENTS

Embodiment 1

Figure 1:
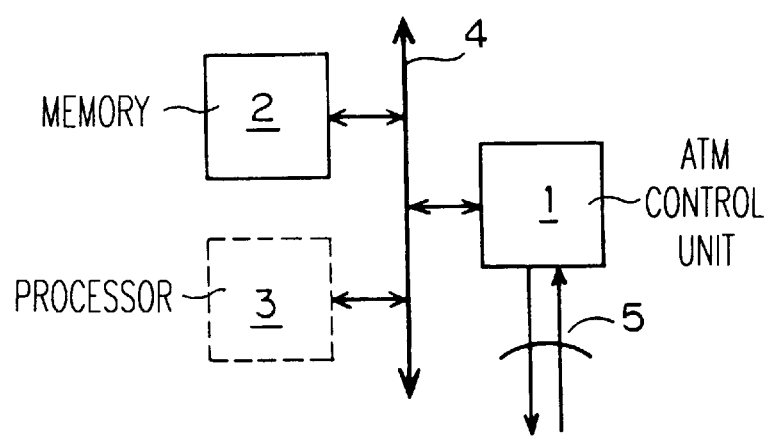
FIGS. 1 and 2 are block diagrams showing an embodiment of the present invention.

FIG. 1 is a block diagram showing an ATM protocol processing apparatus according to an embodiment 1 of the present invention. An ATM control unit 1, a memory 2 and a processor 3 are connected with each other by a bus 4. The ATM control unit 1 transmits/receives data to/from transmission paths (not shown) existing in a communication network through signal lines 5. No processor 3 may be provided depending on the system.

Figure 2:
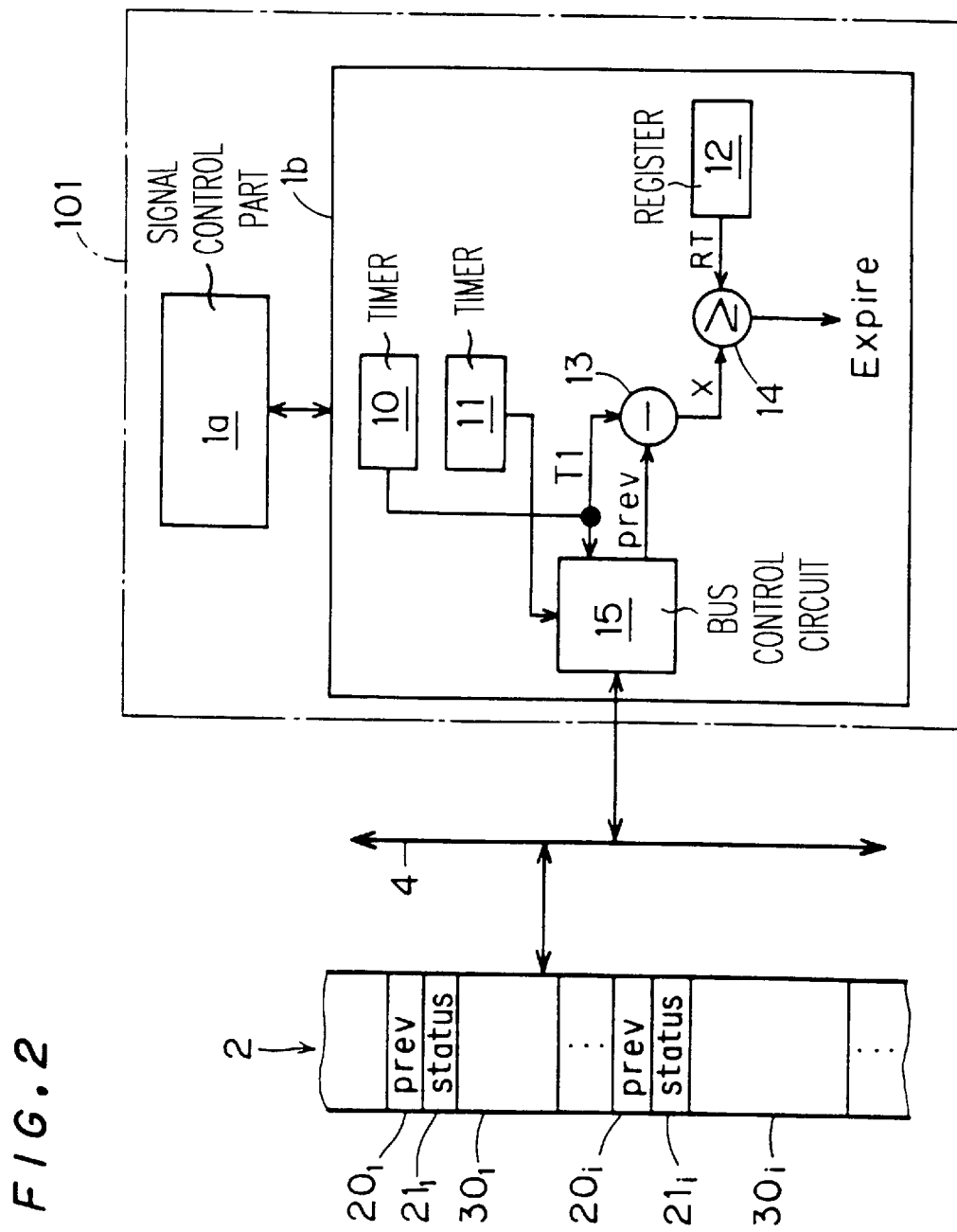

FIG. 2 is a block diagram showing the structure of an ATM control unit 101 which is employed as the ATM control unit 1 and storage regions of the memory 2. The ATM control unit 101 receives cells, which in turn are successively stored in regions $30_1, \ldots, 30_i, \ldots$ every connection, thereby reassembling a frame.

The ATM control unit 101 has a signal control part $1a$ and a signal processing part $1b$. The signal processing part $1b$ comprises a first timer 10 for supplying a current time T1, a second timer 11 for counting a cycle T2, a register 12 for holding a constant value (RT value: hereinafter the value itself is also referred to as RT) in RT, a subtracter 13, a comparator 14, and a bus control circuit 15. The timer 10 may have a counting function for supplying the current time T1, while the same may be a timer on the circuit structure. However, the timer 10 must have a cycle sufficiently larger than the RT value.

The memory 2 stores an information pair consisting of prev and status every connection. For example, the memory 2 stores prev $20_i$ and status $21_i$ for a connection performing frame reassembly in an i-th region $30_i$. These may be stored in a region adjacent to the region $30_i$ as shown in FIG. 2, while the same may alternatively be separately stored in separate regions so far as the same are stored every connection.

The embodiment 1 generally has three operations. The first operation is adapted to store prev and status, the second operation is adapted to read prev and status, and the third operation is adapted to compare an elapsed time after receiving of every cell with the RT value.

The first operation is performed every time a cell is received. When a cell is received, a frame is reassembled with this cell. Cells corresponding to the same frame are transmitted in the same connection, When a cell related to an i-th connection is received, for example, a status after receiving processing including information as to whether or not frame reassembly is completed is stored as status $21_i$. Further, the current time T1 obtained from the timer 10 is stored as prev $20_i$. These signals are controlled by the signal control part $1a$, and written in the memory 2 through the bus control circuit 15 and the bus 4. The first operation is performed every receiving of the cells, whereby prev and status are updated every time.

In other words, information related to a finally received cell is supplied to prev and status. When the final one of cells belonging to a certain frame is received, i.e., when frame reassembly is completed by the cells, the connection is hereinafter also referred to as "new restored connection".

Figure 3:
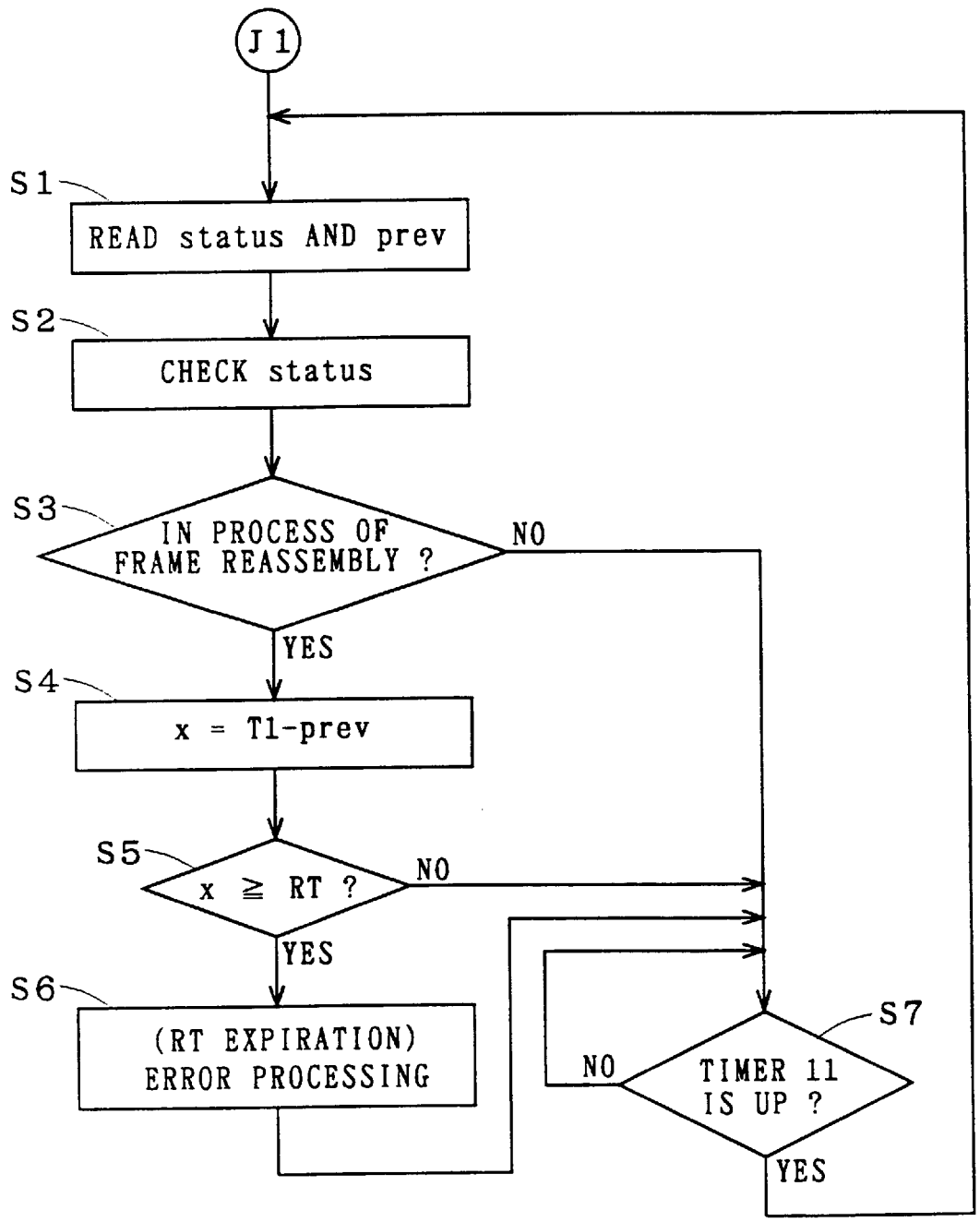
FIGS. 3 to 5 are flow charts showing the operations of the embodiment 1 of the present invention.

The second and third operations are performed every cycle T2 independently of cell receiving. The second and third operations are also controlled by the signal control part $1a$. FIG. 3 is a flow chart showing the second and third operations. While the flow chart forms a loop due to periodic operations, the operations are described from a position J1. At a step S1, prev $(20_1, \ldots, 20_i, \ldots)$ and status $(21_1, \ldots, 21_i, \ldots)$ of each connection are read. Then, status is checked to investigate whether or not the connection is in process of frame reassembly (strep S2).

If the connection is in process of frame reassembly, the subtracter 13 is employed to subtract prev of the connection from the current time T1, thereby obtaining a value x (step S4). Since information related to the finally received cell is stored in prev by the first operation, it results to that the value x indicates the elapsed time from the final receiving of the cell in relation to the connection under frame reassembly.

At a step S5, the comparator 14 is employed for comparing the elapsed time x with the RT value (third operation). If the elapsed time x is larger than the RT value, it means that the next cell is not received after a lapse of a time exceeding the RT value from receiving of the final cell, and hence RT expiration is determined and the process advances to a step S6. At a step S6, error processing, i.e., processing of discarding the frame in reassembly and releasing the region of the memory 2 having stored the cells belonging to this frame, for example, is performed.

The process advances to a step S7 if the elapsed time x is still smaller than the RT value at the step S5 or the error processing is completed at the step S6, or in parallel with the processing at the step S6. At the step S7, time-up of the timer 11 is confirmed. Namely, the processing at the steps S1 to S5 (or further at the step S6) is repeated every cycle T2.

Except in a case where a determination is made that error processing is necessary at the step S5, the memory 2 is accessed only for reading status and prev at first.

Figure 4:
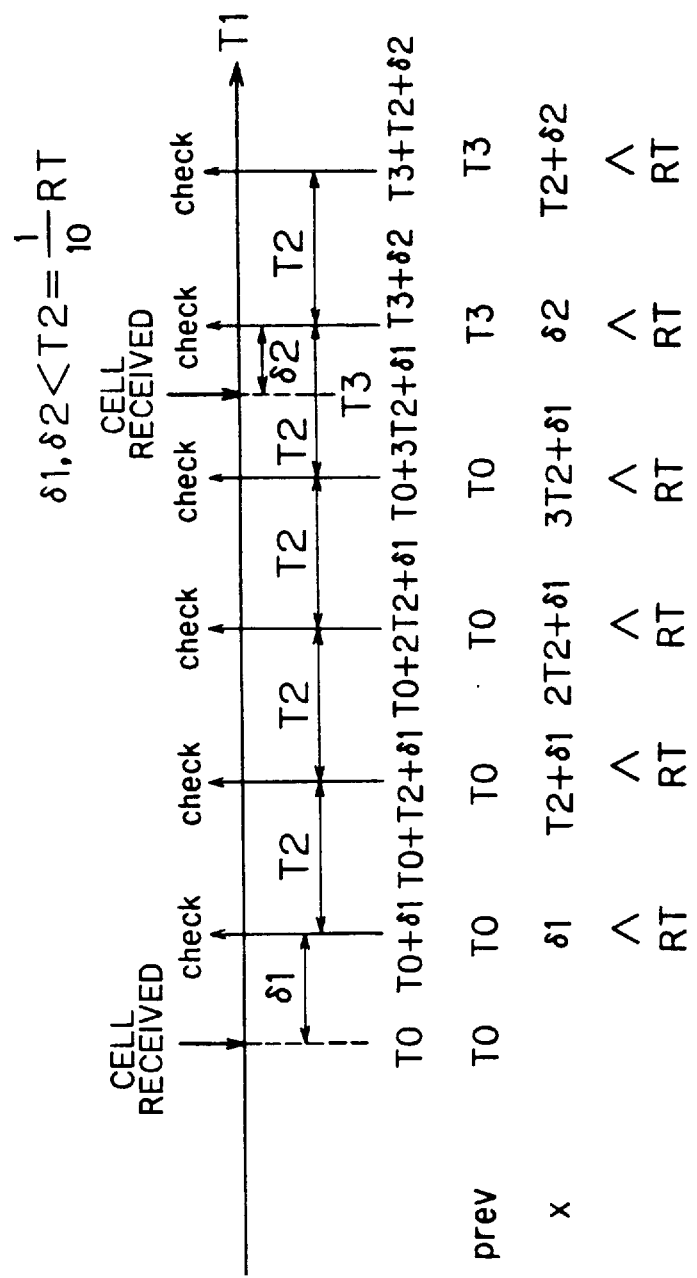
Figure 5:
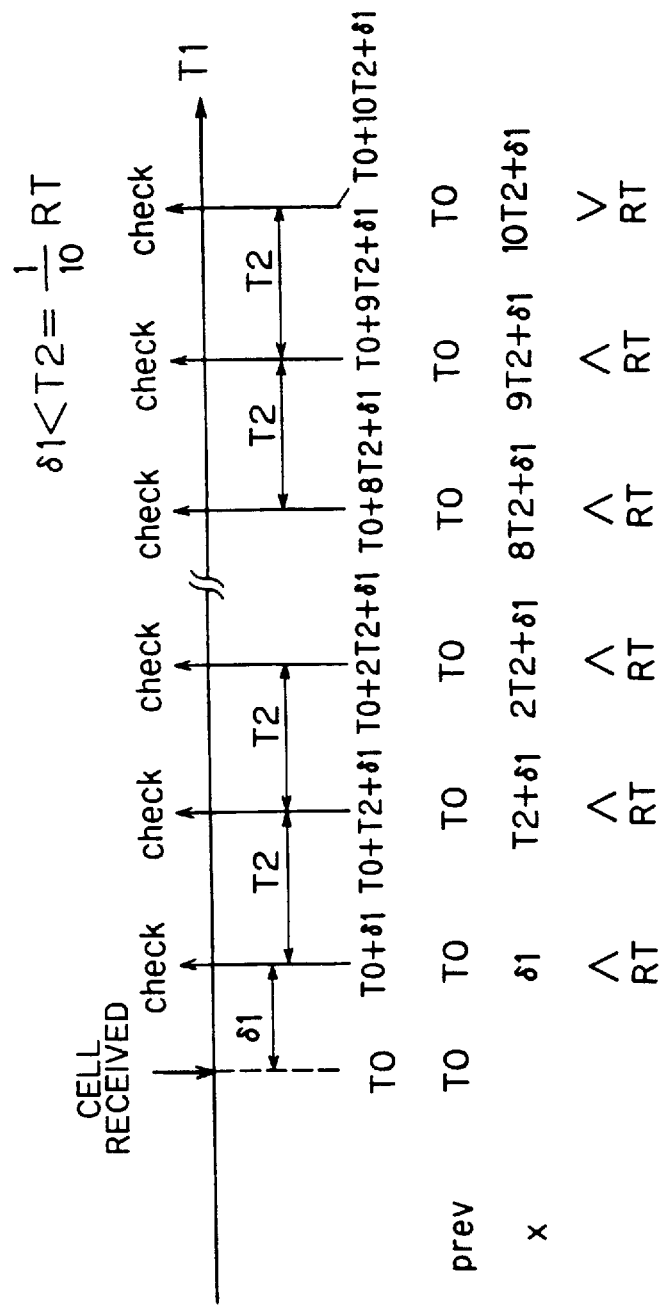

FIGS. 4 and 5 are flow charts showing states of repeating the processing at the steps S1 to S5 every cycle T2 in relation to the same connection respectively. The cycle T2 is set at (1/10)RT, for example. FIGS. 4 and 5 show the cases where determinations of NO and YES are made at the step S5 respectively.

Referring to FIG. 4, a cell is received at a time T0. Thus, the time T0 is stored as prev of this connection (first operation). When a time $\delta 1$ (<T2) elapses from the time T0 and a determination of YES is made at the step S7, the process advances to the steps S1 and S2. It is assumed here that frame reassembly is not yet completed by that performed with the cell received at the time T0. In this case, status having information indicating no completion of frame reassembly is written in the first operation, and a determination of YES is made at the step S3. At a time T1=T0+$\delta 1$, therefore, the elapsed time x obtained at the S4 is T0+$\delta 1$−T0=$\delta 1$. The relation $\delta 1$<T2=(1/10)RT<RT holds, and hence a determination of NO is made at the step S5, and a wait state continues until the timer 11 is up next (step S7). The process returns from the steps S7 to the step S1 at a time T1=T0+T2+$\delta 1$, the aforementioned processing is successively repeated, and the elapsed time x is increased by the cycle T2.

It is assumed that a cell is newly received at a time T1=T3 (T0+3T2+$\delta 1$<T3<T0+4T2+$\delta 1$) and the frame reassembly is still not yet completed by that performed with this cell. The value of prev is updated by the first operation at the time T3 when the cell is newly received. The processing following the step S1 is performed at a time T1=T0+4T2+$\delta 1$=T3+$\delta 2$. $\delta 2$<T2, and hence x=$\delta$. Referring to FIG. 4, every new cell is received before the elapsed time x exceeds the RT value, and hence the process will not advance to the step S6.

Referring to FIG. 5, on the other hand, a cell is received at a time T0. Thus, the time T0 is recorded as prev of this connection (first operation). A time $\delta$ elapses from the time T0 and the process advances to the steps S1 and S2. The value of the elapsed time x is successively increased by T2 from $\delta 1$ every cycle T2.

The elapsed time x reaches 9T2+$\delta 1$ at a current time T1=T0+9T2+$\delta 1$, while x <RT since $\delta 1$<T2=(1/10)RT, and the process advances from the step S5 to the step S7. When the elapsed time x reaches 10T2+$\delta 1$>RT after a lapse of the cycle T2, the error processing at the step S6 is performed.

If a new cell is received after a time T0+10T2 and before a time T0+10T2+$\delta 1$ in FIG. 5, an erroneous determination may be made such that RT is not expired although 10T2=RT elapses, since prev is updated by the first operation. Thus, there is a possibility of an error of the cycle T2 so far as a determination is made as to whether or not times for receiving subsequent two cells exceed the RT value (whether or not RT is expired) with the elapsed time x.

However, it is possible to set the cycle T2 to be smaller than the RT value, e.g., at 10% as described above. Namely, the errors related to the RT value can be suppressed in a prescribed range by employing that having a programmable cycle T2 as the timer 11.

If expiration of RT is detected without the function of the timer 11, each connection must have a timer expired with RT so that the timer is driven during frame reassembly and the value of this timer is cleared every time a cell is received, for determining whether or not RT is expired at the time of expiration of the timer. As compared with this case of providing a timer every connection, the embodiment provided with the timer 11 has such as effect that RT can be implemented with small hardware.

Further, it is also possible to previously calculate a band of the bus 4 necessary for RT by periodically checking the contents of memories of all connections. When the RT value and the error of RT expiration are set at 1 second and 10% respectively, for example, the timer 11 is so programmed that the cycle T2 is 0.1 seconds, and the content of the register 12 is set at 1 second. When the number of all connections is 100, the access number required for RT is one second is 2×(1/0.1)×100=2000 since prev and status are read independently of each other. When the memory width is 32 bits, therefore, the band necessary for implementing RT is 2000 (/sec.)×32 (bits)=64000 (bps)=8 (kBps).

Assuming that the bus clock is 25 MHz and two bus cycles are necessary for reading/writing for addressing and data transfer with no consideration of a wait time of the memory 2, all bands of the bus 4 are calculated as 32 (bits)×25 (MHz)/2=400 (Mbps)=50 (MBps).

In order to reduce the bands, prev and status may be read at the same time.

Figure 6:
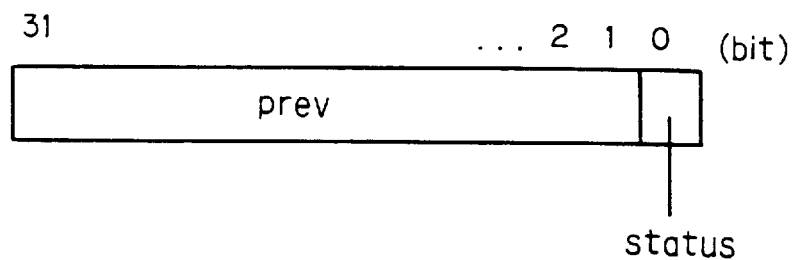
FIG. 6 is a model diagram showing a modification of the embodiment 1 of the present invention.

FIG. 6 is a model diagram showing the data structure of prev and status in the memory 2. In data having a data length of 32 bits, prev and status coexist. For example, status and prev can be arranged in a 0-th bit and first to 32nd bits respectively, status has 1-bit information of "1"/"0" in correspondence to whether or not frame reassembly is in process. Thus, prev and status can be read/written by simply accessing the same address, whereby the band necessary for RT can be halved.

Embodiment 2

Figure 7:
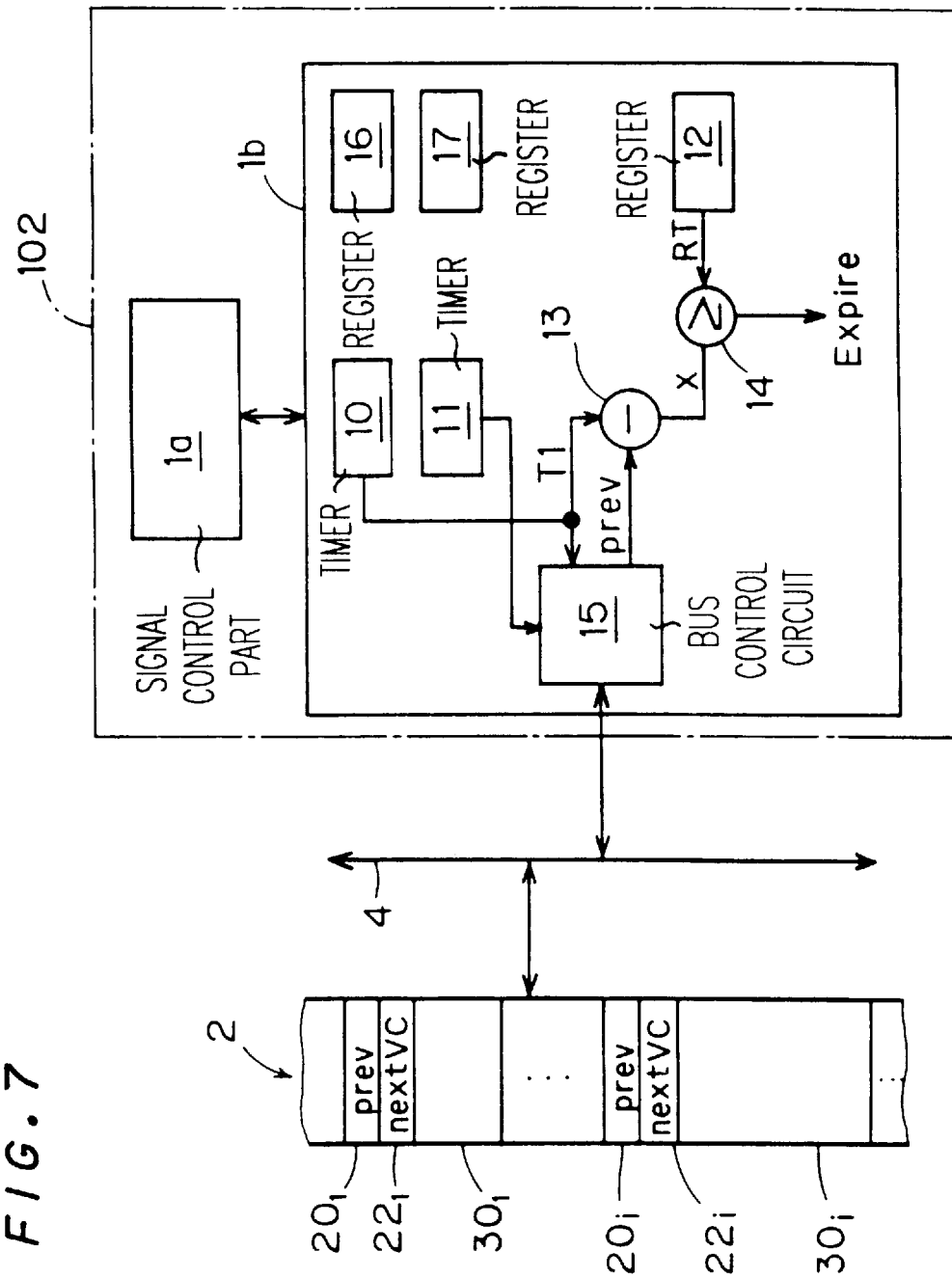
FIG. 7 is a block diagram showing an embodiment 2 of the present invention.

FIG. 7 is a block diagram showing the structure of an ATM control unit 102 and storage regions of a memory 2 according to an embodiment 2 of the present invention. The ATM control unit 102 can also be employed as the ATM control unit 1 shown in FIG. 1. The ATM control unit 102 has a structure obtained by further adding registers 16 and 17 to the ATM control unit 101.

The memory 2 stores an information pair consisting of prev and nextVC every connection. Namely, nextVC is employed in place of status employed in the embodiment 1. For example, prev $20_i$ and nextVC $22_i$ are stored with respect to a connection for frame reassembly in an i-th region $30_i$. These may be stored in a region adjacent to the region $30_i$ as shown in FIG. 7, while the same may alternatively be separately stored in separate regions so far as the same are stored every connection.

In the embodiment 2, a linked list is formed by only information pairs corresponding to a connection (hereinafter also referred to as "unrestored connection") in process of frame reassembly, and an elapsed time x is checked only in relation to the connection related to the information pairs forming the linked list. The information pairs are set every connection and the former and the latter are in one-to-one correspondence, and hence it can be said that the linked list is formed by the connection.

The embodiment 2 also has three operations in general. The first operation is adapted to store prev, the second operation is adapted to update the linked list, and the third operation is adapted to compare an elapsed time related to an unrestored connection with an RT value along the linked list. These operations are also controlled by a single control part $1a$.

The first operation is similar to that of the embodiment 1, except that neither status nor nextVC is stored. A current time T1 obtained from a first timer 10 is simply stored as prev $20_i$ every time a cell is received. The second operation is performed every receiving of the cells, similarly to the first operation.

Figure 8:
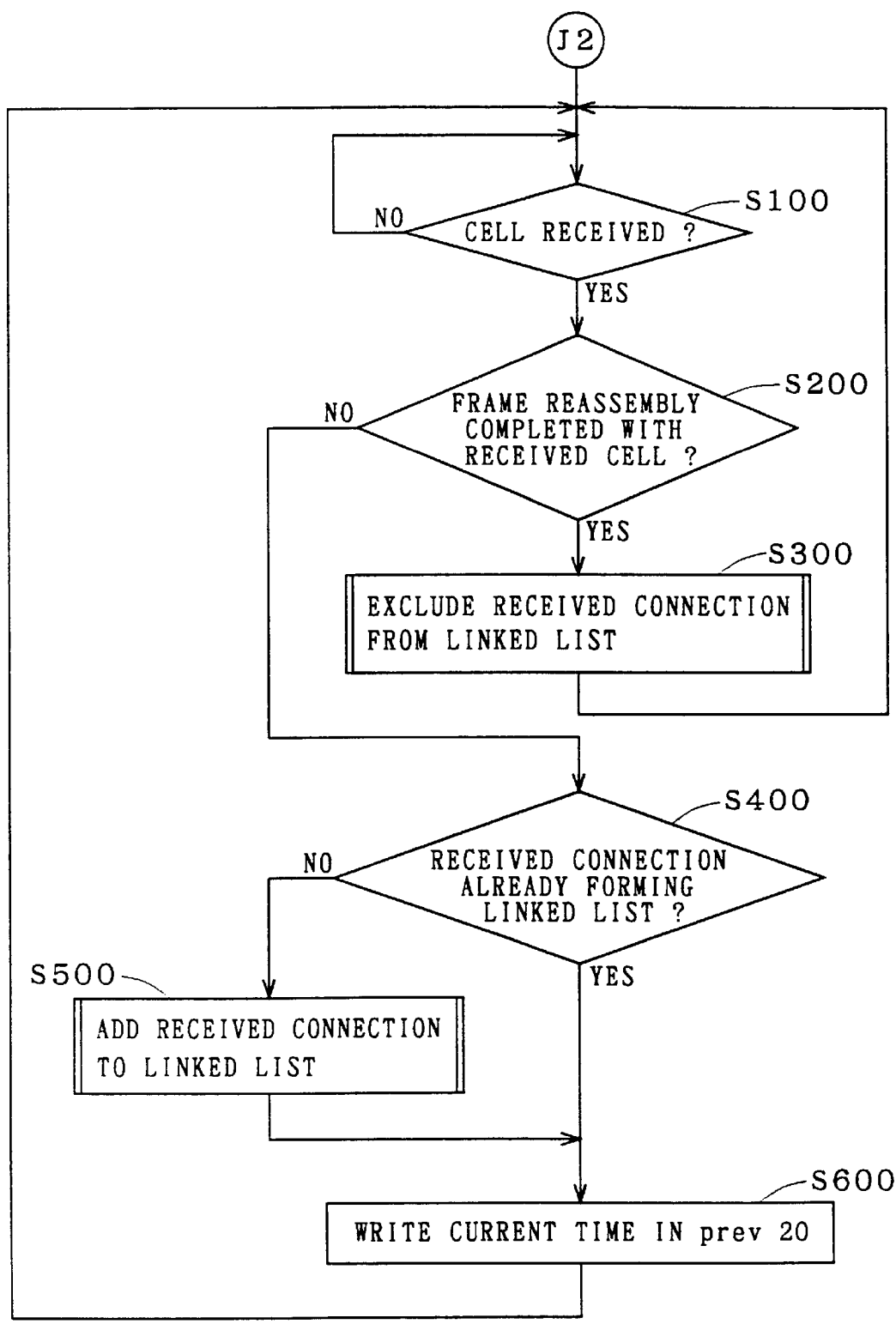
FIG. 8 is a flow chart showing the operations of the embodiment 2 of the present invention.

FIG. 8 is a flow chart showing the first and second operations. While the flow chart forms a loop due to repeated operations, the operations are described from a position J2.

A wait state continues until a cell is received at a step S100, and the process advances to a step S200 by receiving the cell. A connection corresponding to the received cell is called a received connection tentatively.

At the step S200, a determination is made as to whether or not frame reassembly is completed by that performed with the received cell. If the determination is of NO, the received connection is an unrestored connection, and the process advances to a step S400. If the determination is of YES, on the other hand, the process returns to the step S100 through a step S300.

At the step S400, a determination is made as to whether or not the received connection which is an unrestored connection is already an element forming a linked list. Namely, a determination of NO is made at the step S400 if a first cell belonging to a certain frame is received, while a determination of YES is received if a cell which is not the first one belonging to the certain frame is received. If the final cell belonging to a certain frame is received, a determination of YES has been made at the step S200 in relation to the received connection, which is subjected to no determination at the step S400.

The process directly advances to a step S600 if the determination at the step S400 is of YES. If the determination at the step S400 is of NO, on the other hand, the process advances to the step S600 through a step S500. At the step S600, the first operation, i.e., writing of a current time in prev related to the received connection, is performed.

The steps S300 and S500 are adapted to exclude and add the received connection from and to the linked list respectively.

The content of the step S500 is now described with the inclusion of such a case that an unrestored connection (i.e., a connection forming a linked list) newly appears from a condition including no unrestored connection (this necessarily corresponds to the case of receiving the first cell belonging to a certain frame).

First, registers 16 and 17 and nextVC of each connection are cleared. When a cell is newly received in relation to a j-th connection, pointers indicating the position of a region storing an information pair prev $20_j$ and nextVC $22_j$ (or further a region $30_j$) are set in both of the registers 16 and 17. However, nextVC $22_j$ itself remains cleared.

When a cell is newly received in relation to a k-th connection while frame reassembly is not yet completed in relation to the j-th connection, the register 17 is updated to a pointer indicating the position of a region storing an information pair prev $20_k$ and nextVC $22_k$ (or further a region $30_k$) related to the k-th connection while the content of the register 16 remains unchanged. The same content as in the resister 17 is supplied to nextVC $22_j$.

When a cell is newly received in relation to an m-th connection while frame reassembly is not yet completed in relation to each of the j-th and k-th connections, further, the register 17 is updated to a pointer indicating the position of a region storing an information pair prev $20_m$ and nextVC $22_m$ (or further a region $30_m$) related to the m-th connection while the content of the register 16 remains unchanged. The same content as in the resister 17 is supplied to nextVC $22_k$.

Thus, nextVC of each unrestored connection indicates the storage region related to the next unrestored connection, for constructing a linked list. It results that the registers 16 and 17 store head and end addresses of the linked list respectively.

Figure 9:
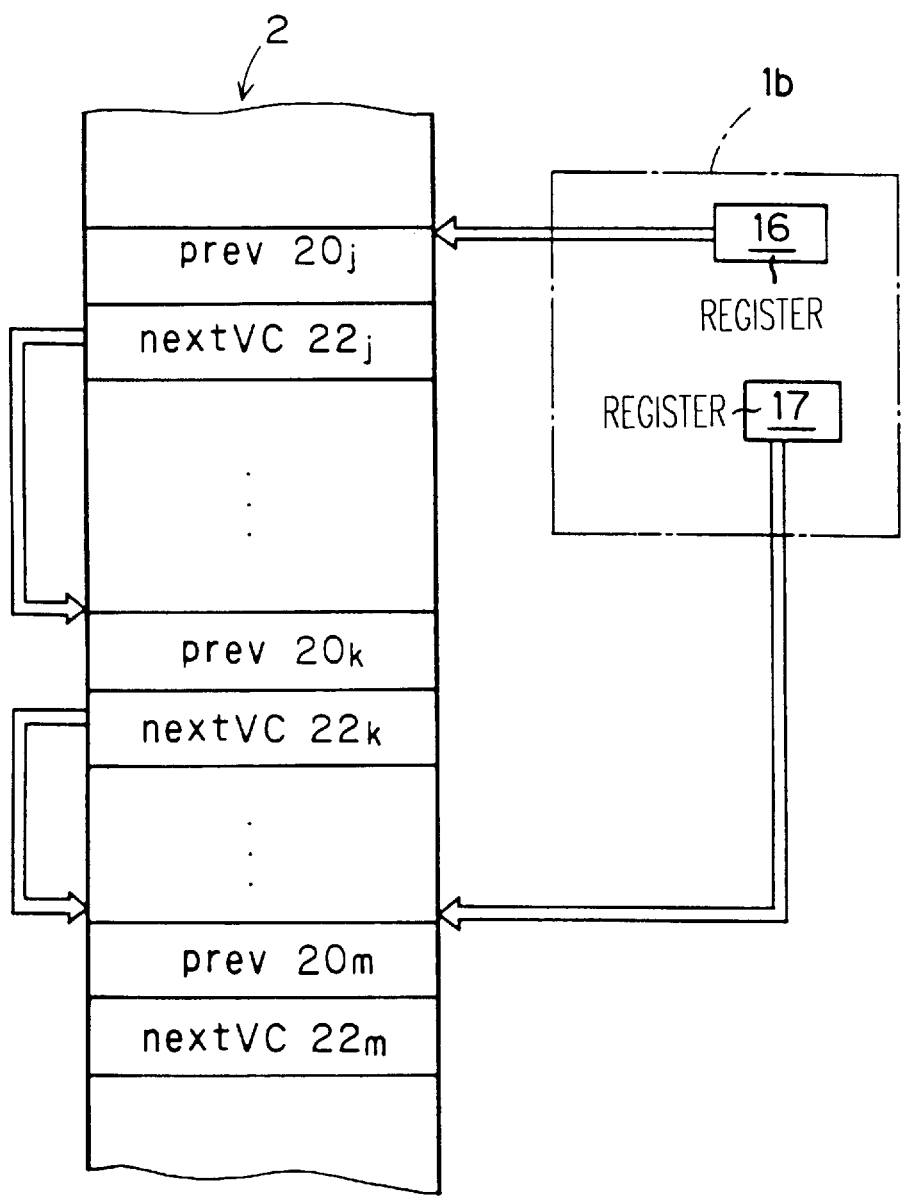
FIG. 9 is a model diagram showing the embodiment 2 of the present invention.

FIG. 9 is a model diagram showing a linked list which is structured in the aforementioned manner. This figure indicates that regions provided on the bases of white arrows have information related to the positions of regions indicated by forward ends of the white arrows.

Describing the content of the step S500 in detail, it results to that "the position of a storage region for an information pair related to a received connection which is a new unrestored connection is stored in nextVC of an information pair which has previously been the end of a linked list and in the register 17".

The step S300 is now described in detail with reference to such case that the k-th connection becomes a new restored connection from a state of constructing a linked list as shown in FIG. 9. Also when the k-th connection is excluded, the j-th and m-th connections must be left in the linked list, and hence the same must be coupled with each other. Thus, the content of nextVC $22_j$ related to the j-th connection is updated with nextVC $22_k$ having indicated the position of the information pair of the m-th connection.

Describing the content of the step S300 in this case, it comes to that "next VC having indicated the storage region of an information pair for a new restored connection is updated with next VC of the new restored connection".

If the new restored connection is the head of the linked list, however, there is no nextVC having indicated the storage region of the information pair of the new restored connection. Referring to FIG. 9, there is no nextVC indicating the position of prev $20_j$ and nextVC $22_j$ related to the j-th connection. Instead, this position is stored in the register 16. Describing the content of the step S300 in this case, therefore, it comes to that "the head address of a linked list having indicated the storage region of an information pair of a new restored connection is updated with nextVC of the new restored connection".

Figure 10:
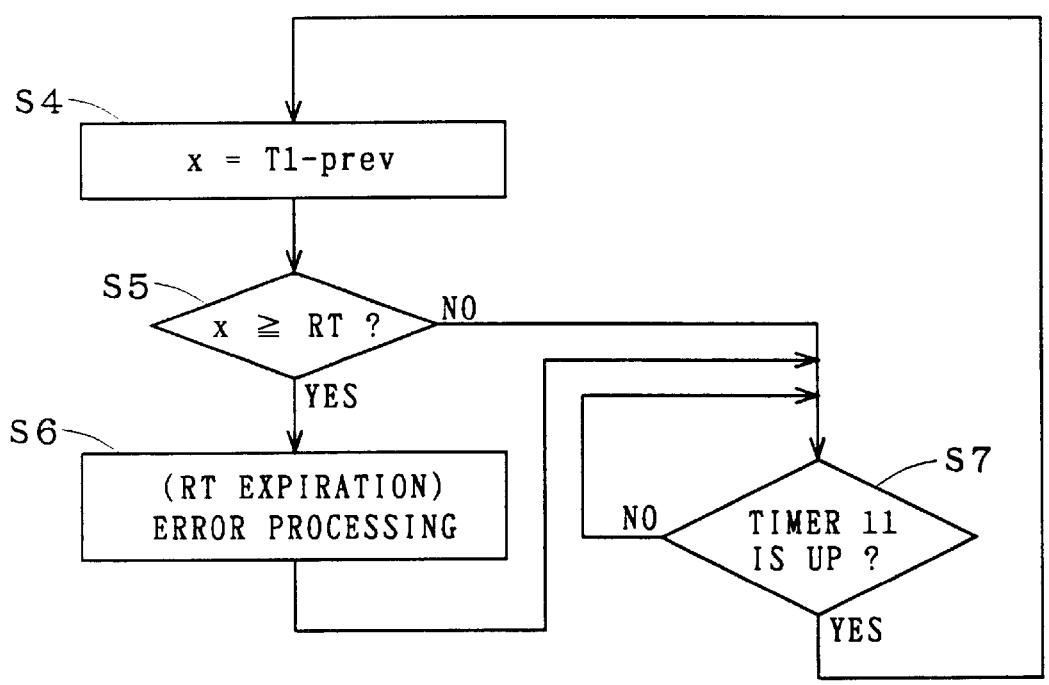
FIG. 10 is a flow chart showing the operations of the embodiment 2 of the present invention.

The third operation is adapted to obtain the elapsed time x every unrestored connection while successively reading prev $20_j$, prev $20_k$ and prev $20_m$ in FIG. 9 along the linked list, i.e., from the initial address stored in the register 16 to the end address stored in the register 17. FIG. 10 is a flow chart showing the third operation. As compared with the third operation of the embodiment shown in FIG. 3, the steps S1, S2 and S3 are omitted while steps S4 to S7 are identical. Therefore, the memory 2 is accessed only as to information pairs related to unrestored ones among connections, whereby RT can be implemented similarly to the embodiment 1 while suppressing a necessary band of a bus.

Not only prev but nextVC must be accessed in order to follow the linked list, and hence the number of times for accessing the memory 2 in one second is 2000×0.2=400 assuming that the ratio of operating connections to all connections is 20% while applying conditions in a case of obtaining the access number in the embodiment 1.

Due to the aforementioned technique, RT can be implemented while reducing the necessary band by simply adding the registers 16 and 17, without remarkably increasing the hardware volume.

If overhead for controlling the unrestored connections, e.g., updating of nextVC in the second operation is also increased to an unneglectful degree for the third operation as the ratio of simultaneously operating connections is increased, the embodiment 1 may be rather preferable.

In case of excluding the k-th connections, for example, from the linked list as a new restored connections, it is necessary to access nextVC $22_j$ of the j-th connection. Therefore, it is preferable to indicate the position of a region storing information related to an unrestored connection which is precedent to the k-th connection in order in the linked list as information to be stored in relation to the k-th connection, in addition to prev and nextVC.

Embodiment 3

Figure 11:
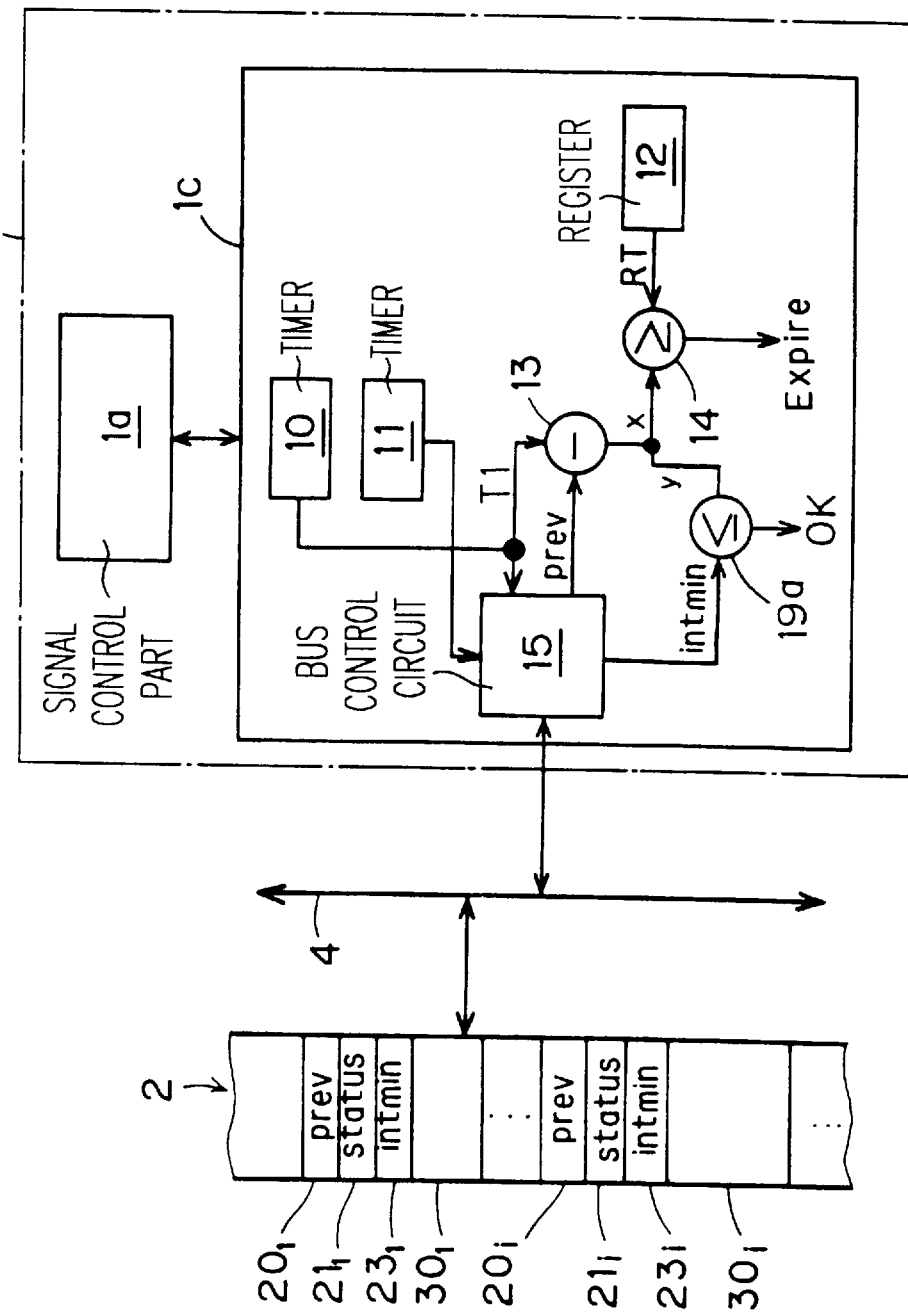
FIG. 11 is a block diagram showing an embodiment 3 of the present invention.

FIG. 11 is a block diagram showing the structure of an ATM control unit 103 and storage regions of a memory 2 according to an embodiment 3 of the present invention. The ATM control unit 103 has a signal control part 1a and a signal processing part 1c, and the signal processing part 1c has a structure obtained by further adding a comparator 19a to the signal processing part 1b.

As compared with the embodiment 1, an additional content is stored in the memory 2 of the embodiment 3. The memory 3 stores as information trio consisting of prev, status and intmin every connection. Namely, intmin is employed in addition to prev and status employed in the embodiment 1. The embodiment 3 is adapted to perform a fourth operation employing prev and intmin in addition to first to third operations which are identical to those of the embodiment 1, for implementing UPC along with RT.

The memory 2 stores prev $20_i$, status $21_i$ and intmin $23_i$ in relation to a connection for reassembling a frame in an i-th region $30_i$, for example. These may be stored in a region adjacent to the region $30_i$ as shown in FIG. 11, while the same may alternatively be separately stored in separate regions so far as the same are stored every connection.

If a band allowing signal transmission in a certain transmission path is 10 MHz, for example, this value is the upper limit of the total sum of bands allowed for a plurality of connections utilizing the transmission path respectively. When first to fourth connections utilize the same transmission path, for example, bands of 1 MHz, 4 MHz, 2 MHz and 3 MHz are allowed for these connections respectively. If cell transmission in any connection is performed in a band beyond the allowed range, this exerts bad influences on other connections.

In order to avoid this, the embodiment 3 is adapted to check whether or not cell transmission over a band beyond the allowed range is performed every connection. Namely, whether or not the interval of cell transmission is too wide is checked in RT, while whether or not the interval of cell transmission is too narrow is checked in UPC. As to intmin, a time corresponding to the allowed band every connection, i.e., the minimum time allowed for the interval between cells adjacently transmitted in the same connection is set.

Figure 12:
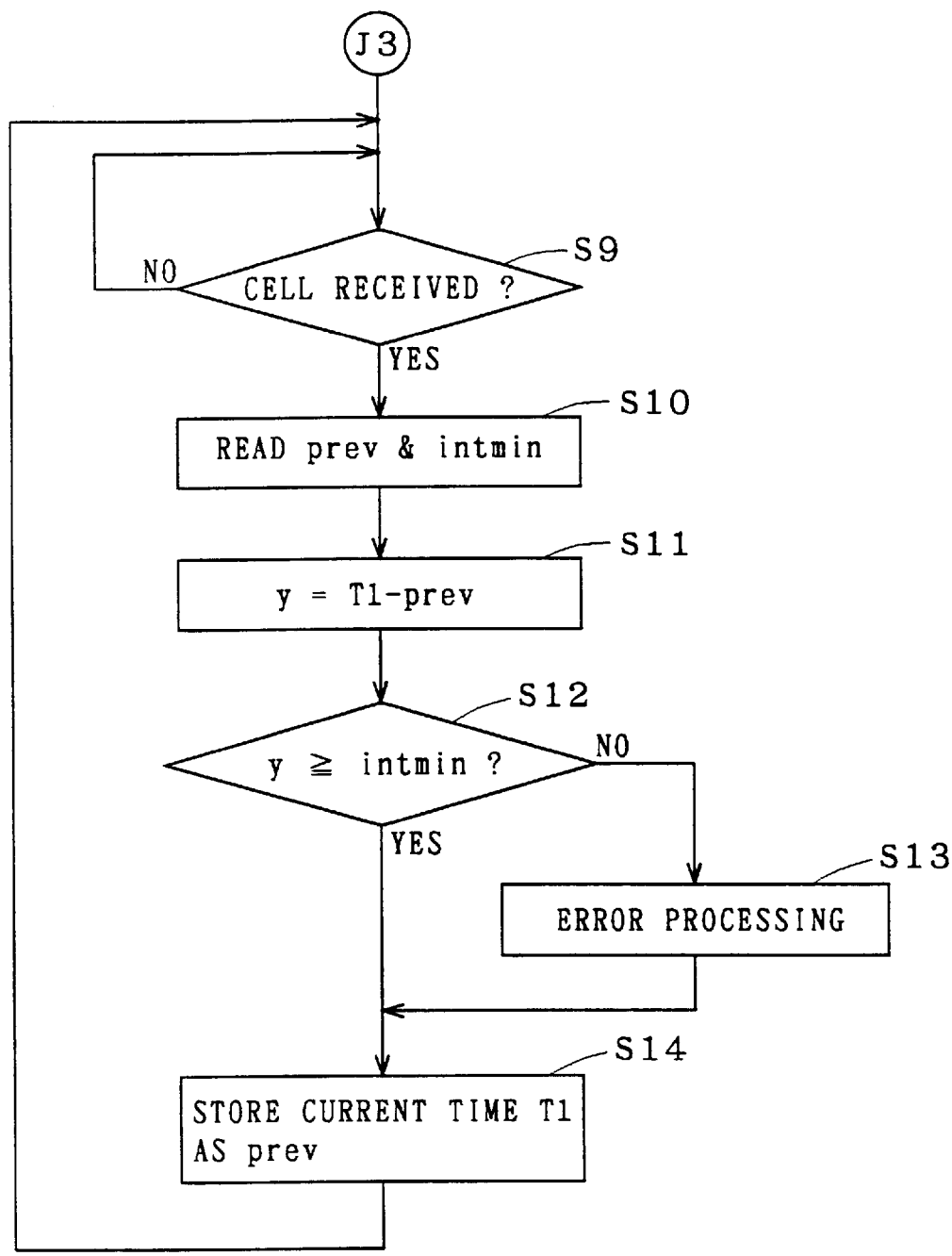
FIG. 12 is a flow chart showing the operation of the embodiment 3 of the present invention.

FIG. 12 is a flow chart showing the fourth operation. The fourth operation is performed every time a cell is received. While the flow chart forms a loop due to a repeated operation, the operation is described from a position J3. At a step S9, a wait state continues until a cell is received in the fourth operation. At a step S10, prev $(20_1, \ldots, 20_i, \ldots)$ and $(23_1, \ldots, 23_i, \ldots)$ of each connection are read. The process advances to a step S11, so that prev is subtracted from a current time T1 for obtaining an elapsed time y. Both of the current time T1 and prev are obtained at a timing for receiving the cell, whereby it results to that the elapsed time y is not influenced by a cycle T2 of a timer 11 but indicates the interval between adjacently received cells in each connection.

At a step S12, the comparator 19a compares the elapsed time y with intmin. If y≧intmin, a determination of YES is made at the step S12. In this case, the cell is transmitted in an allowed band, and hence the process advances to a step S14. If y<intmin, on the other hand, a determination of NO is made at the step S12. In this case, the cell is transmitted beyond the allowed band, and hence the process advances to a step S13 for error processing, and then advances to the step S14. The step S13 may alternatively be carried out simultaneously with the processing at the step S14 as described later.

At the step S14, prev is updated with the current time T1. Namely, the first operation is performed. If the first operation is performed before the step S10, the elapsed time y is regularly "0" and up UPC can be implemented when the treatment times expended for the steps S10 and S11 are neglected. Thus, the step S14 must be set after the step S10. Alternatively, the step S14 can be provided between the steps S10 and S12.

The embodiment 3 is applicable to the mode shown in the embodiment 2, as a matter of course. In other words, intmin may be employed in addition to prev and nextVC employed in the embodiment 2, so that an information trio consisting of prev, nextVC and intmin is stored every connection.

The intervals between cells may be locally narrowed in a case of communication through LAN or the like, although the cells are transmitted in allowed bands. In this case, the average of all transmitted cells may satisfy the band and no error processing may be performed.

Figure 13:
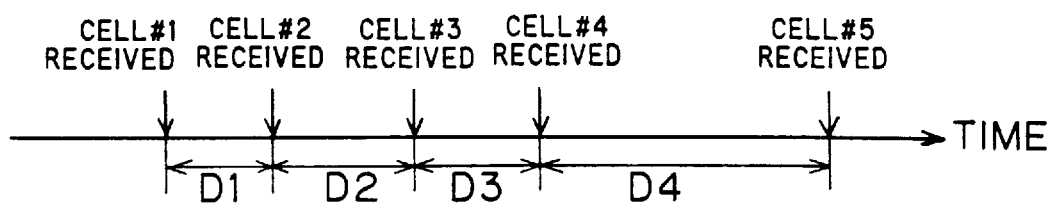
FIG. 13 is a conceptual diagram showing a modification of the embodiment 3 of the present invention.

In order to accommodate for communication having characteristics which are varied with time, UPC can be implemented by dynamically updating intmin by receiving the cells. FIG. 13 is a conceptual diagram showing rewriting of intmin in such a case.

If every one of distances D1 to D3 between four cells #1 to #4 adjacently transmitting the same connection is smaller than a first value M1 of intmin, for example, intmin is updated to a second value M2 which is larger than M1, and error processing is performed if the distance D4 between the cell #4 and a fifth cell #5 is smaller than M2 while no error processing is performed if the distance D4 is in excess of M2. Such updating can also be performed under control by the signal control part 1a.

Embodiment 4

Figure 14:
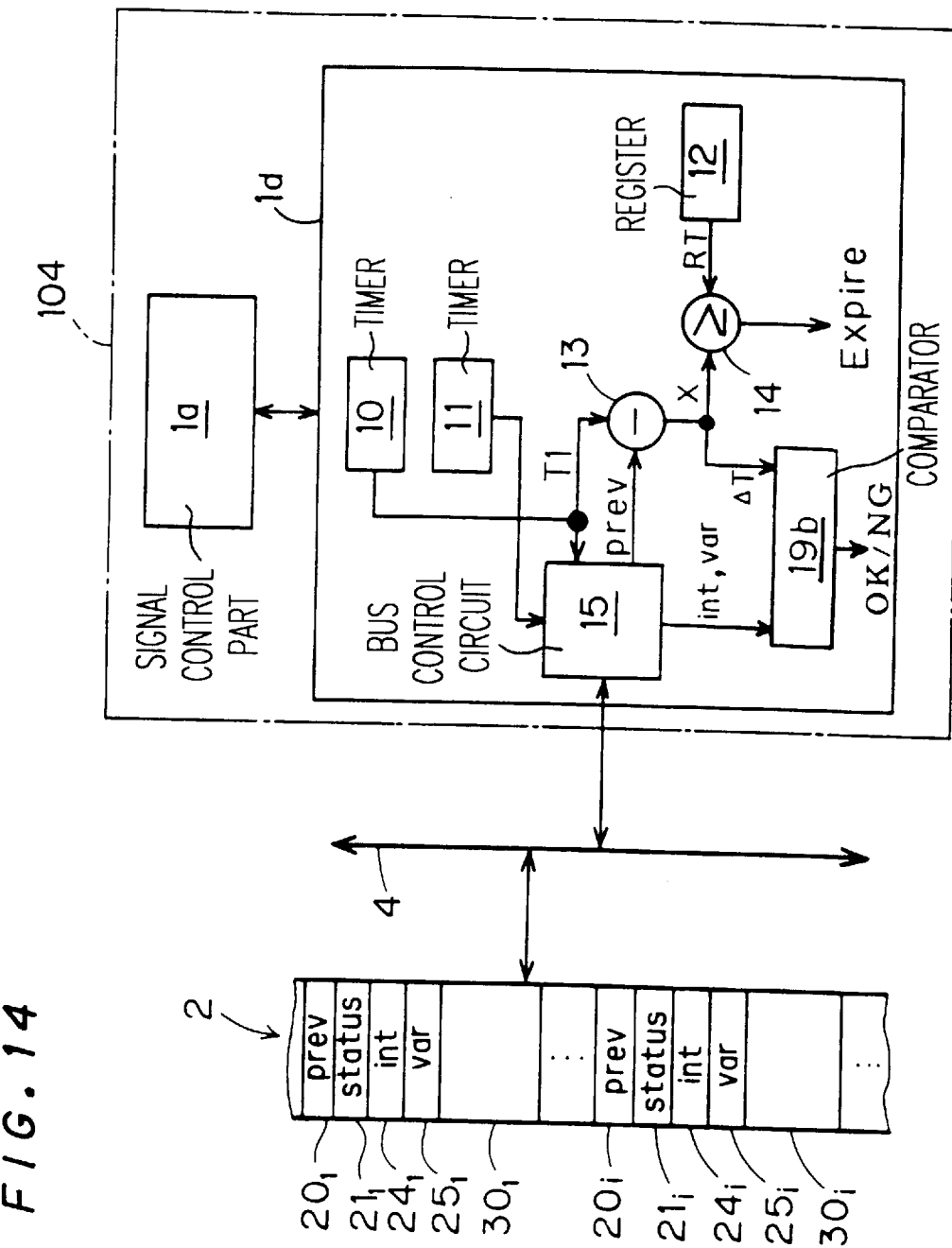
FIG. 14 is a block diagram showing an embodiment 4 of the present invention.

FIG. 14 is a block diagram showing the structure of an ATM control unit 104 and storage regions of a memory 2 according to an embodiment 4 of the present invention. The ATM control unit 104 has a signal control part 1a and a signal processing part 1d, and the signal processing part 1d has a structure obtained by further adding a comparator 19b to the signal processing part 1b.

As compared with the embodiment 1, two additional contents are stored in the memory 2 in the embodiment 4. The memory 2 stores an information set consisting of four elements prev, status, int and var every connection. Namely, int and var are employed in addition to prev and status employed in the embodiment 1. The embodiment 4 carries out a fourth operation employing prev, int and var in addition to first to third operations which are identical to those of the embodiment 1, for implementing UPC along with RT. In the fourth operation of the embodiment 4, int and var serve a function corresponding to intmin in the fourth operation of the third embodiment.

For example, prev $20_i$, status $21_i$, int $24_i$ and var $25_i$ are stored with respect to a connection for reassembling a frame in an i-th region $30_i$. These may be stored in a region adjacent to the region $30_i$ as shown in FIG. 14, while the same may alternatively be separately stored in separate regions as long as the same are stored every connection.

In the embodiment 4, a determination is made as to whether or not cell transmission is performed at prescribed intervals substantially at regular intervals. Cell transmission which is performed at an interval of at least (int−var) and not more than (int+var) is determined as normal. If cell transmission is performed at other intervals, a determination is made that no cell is normally transmitted and error processing is performed. Namely, int and var are set as a preferable interval for cell transmission and an allowable range therefor every connection respectively.

Figure 15:
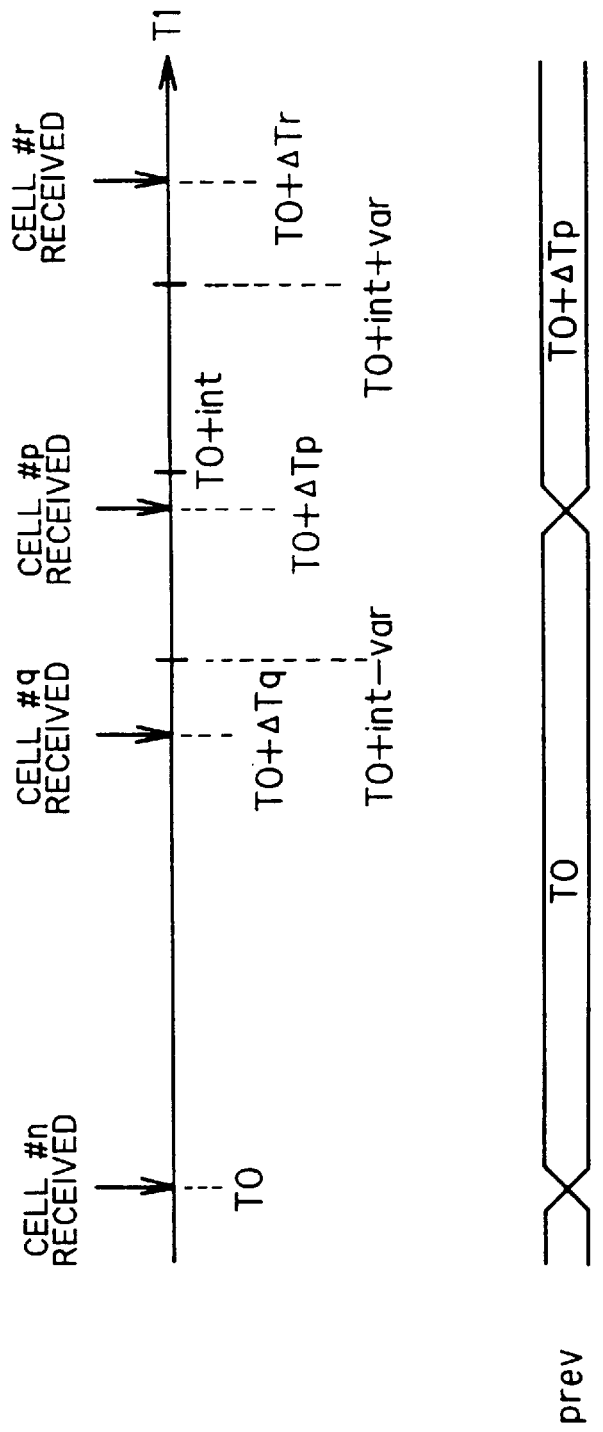
FIG. 15 is a timing chart showing the operation of the embodiment 4 of the present invention.

FIG. 15 is a timing chart indicating the aforementioned determination. A cell #n is received at a time T0. Another cell #p is received at a time T0+ΔTp after a lapse of a time ΔTp, and this cell #p is determined as normal if T0+int−var≦T0+ΔTp≦T0+int+var holds. Referring to FIG. 15, prev is updated from T0 to T0+ΔTp due to the receiving of the cell #p (first operation).

If a cell #q is received at a time T0+ΔTq after a lapse of a time ΔTq from the time T0 in place of the receiving of the cell #p and T0+int−var>T0+ΔTq holds, the cell #q is determined as abnormal. Similarly, if a cell #r is received at a time T0+ΔTr after a lapse of a time ΔTr from the time T0 in place of the receiving of the cell #p and T0+int+var<T0+ΔTr holds, the cell #r is also determined as abnormal.

Figure 16:
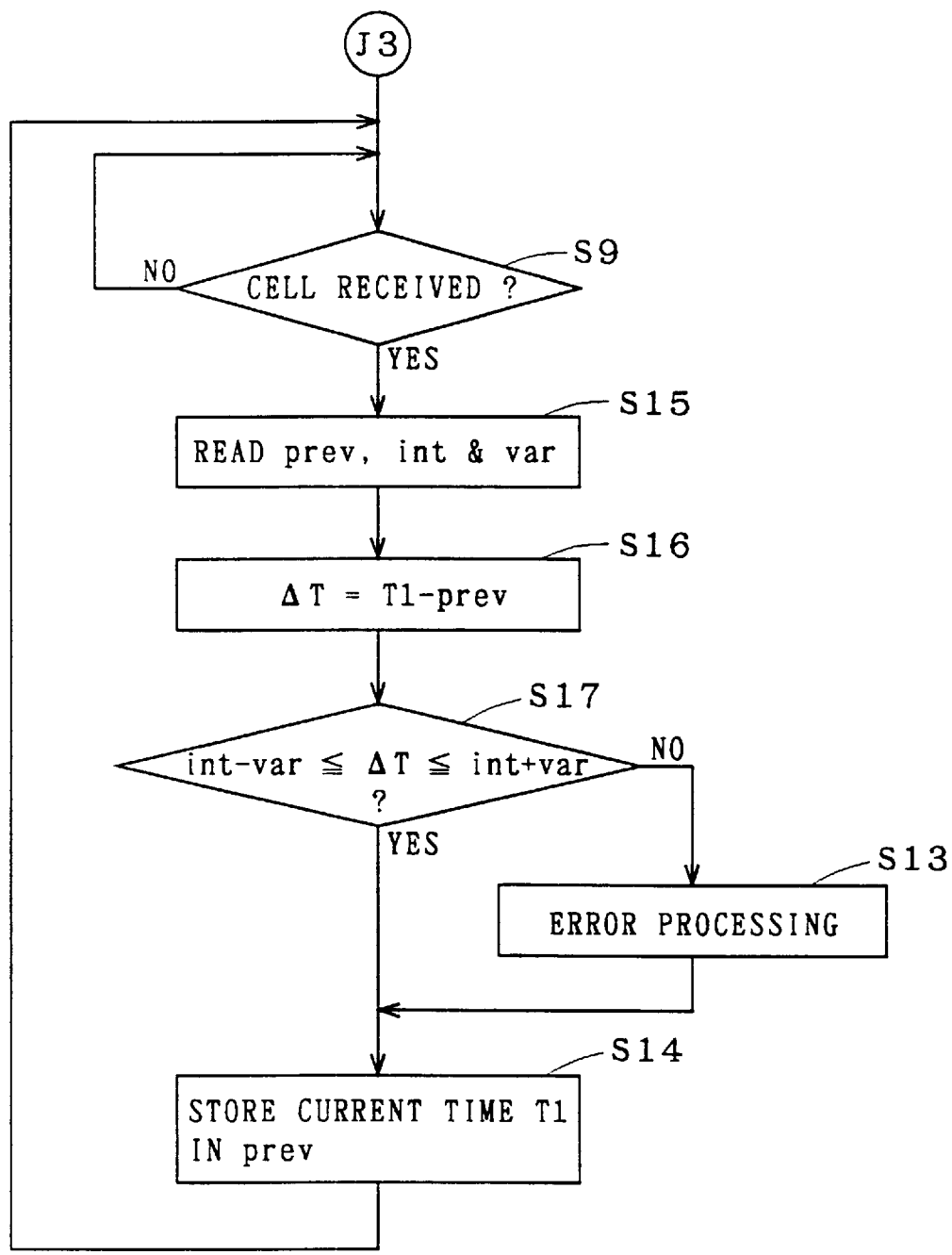
FIG. 16 is a flow chart showing the operation of the embodiment 4 of the present invention.

FIG. 16 is a flow chart showing the fourth operation. This operation is similar to the fourth operation shown in FIG. 12, except that the steps S10, S11 and S12 are replaced with steps S15, S16 and S17 respectively. At the step S15, prev, int and var are loaded, and the difference between a current time T1 and prev is obtained as ΔT at the step S16. The current time T1=T0 receiving a cell (corresponding to the cell #n in FIG. 15) in advance of a noted cell (corresponding to #p, #q or #r shown in FIG. 15) is stored in prev, and hence it results to that ΔT indicates the transmission interval (corresponding to ΔTp, ΔTq or ΔTr shown in FIG. 15) between cells adjacently received in the same connection.

In order to make the determination described with reference to FIG. 15, therefore, the noted cell may be determined as normal if int−var≦ΔT≦int+var holds at the step S17 while the same may be determined as abnormal in other cases. Such processing is performed in the comparator 19b. Processing following the step S17 is similar to that of the embodiment 3.

The step S14 can be provided between the steps S15 and S17 but cannot be provided in advance of the step S15, also similarly to the embodiment 3.

The condition at the step S17 may be replaced. The aforementioned condition of the step S17 is required if real time communication is necessary in a case of a telephone or the like, while the condition of the step S17 is not necessarily required in document communication or the like. Namely, a short cell transmission interval is obstructive but a long interval is not obstructive, similarly to the case of the embodiment 3. In the latter case, the determination condition at the step S17 can be set whether int−var≦ΔT holds (YES) or not (NO). Referring to FIG. 15, for example, the cells #q and #r are determined as abnormally and abnormally transmitted respectively.

Embodiment 5

While the embodiment 4 can also be applied to the embodiment 2 similarly to the embodiment 3. the first operation of the embodiment 4 can also be improved with respect to the fist operations of the embodiments 1 and 2. As a concrete example, a first operation does not necessarily supply a current time to prev in an embodiment 5. Another value may be supplied to prev, in order to avoid such a case that a timing for transmitting a subsequent cell is erroneously determined due to setting of an allowable range var.

Figure 17:
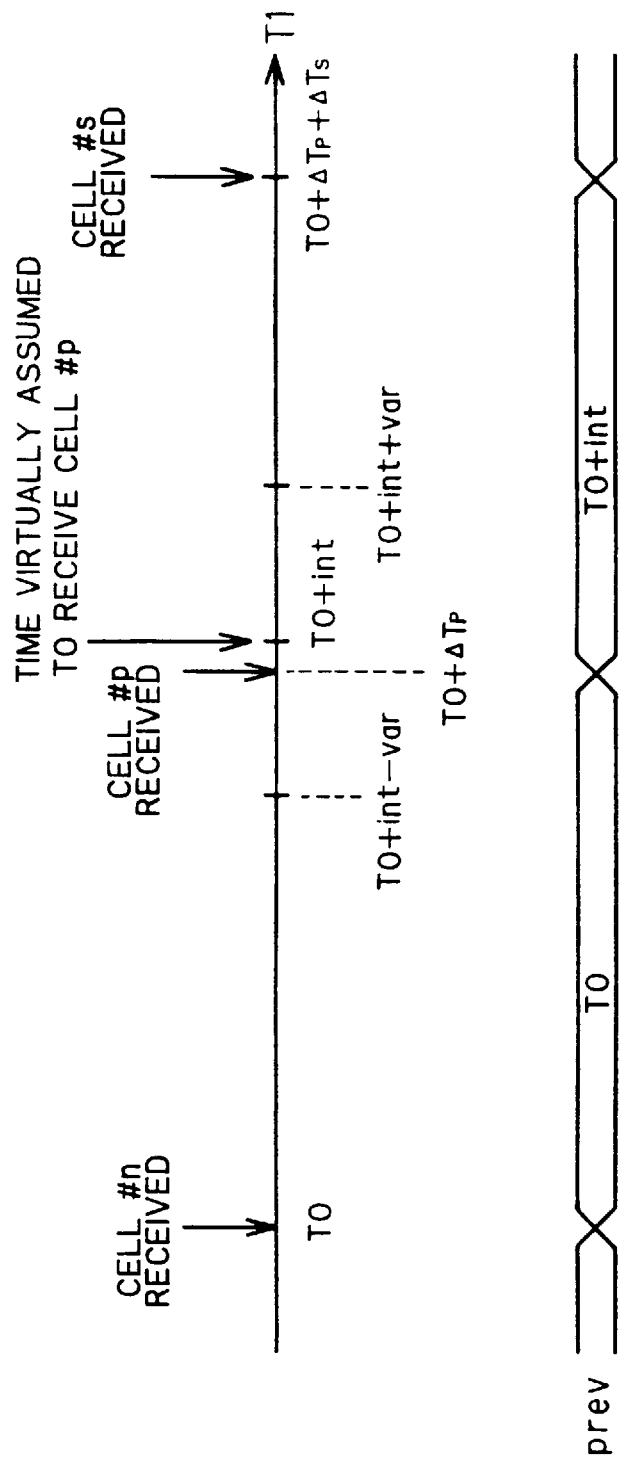
FIG. 17 is a timing chart showing the operation of an embodiment 5 of the present invention.

FIG. 17 is a timing chart showing the first operation in the embodiment 5. A cell #n is received at a time T0. For simplification of the description, it is assumed here that prev is updated with the time T0 by receiving of the cell #n, also when prev is supplied in a manner described later, as a matter of course.

If a cell #p is received at a time T0+ΔTp after a lapse of a time ΔTp after receiving of the cell #n, T0+int−var≦T0+Δp≦T0+int+var holds and hence the cell #p is determined as normal. Then, prev is updated from T0 to T0+int due to the receiving of the cell #p.

Namely, if the cell #p is received after a time (prev+int−var) and before a time (prev+int+var), the time receiving the cell #p is virtually impartially assumed to be T0+int. Therefore, ΔT determined at the step S17 when a time ΔTs lapses from the receiving of the cell #p and a cell #s is received is not ΔTs, but is equal to ΔTp+ΔTs−int.

When the content of the step S14 is changed to "add int to prev", it results to that FIG. 16 shows the operation of the embodiment 5. Thus, such a state that the magnitudes of the bands of the overall connections are erroneously determined due to the fact that the allowable range var is cumulatively determined is avoided.

Figure 18:
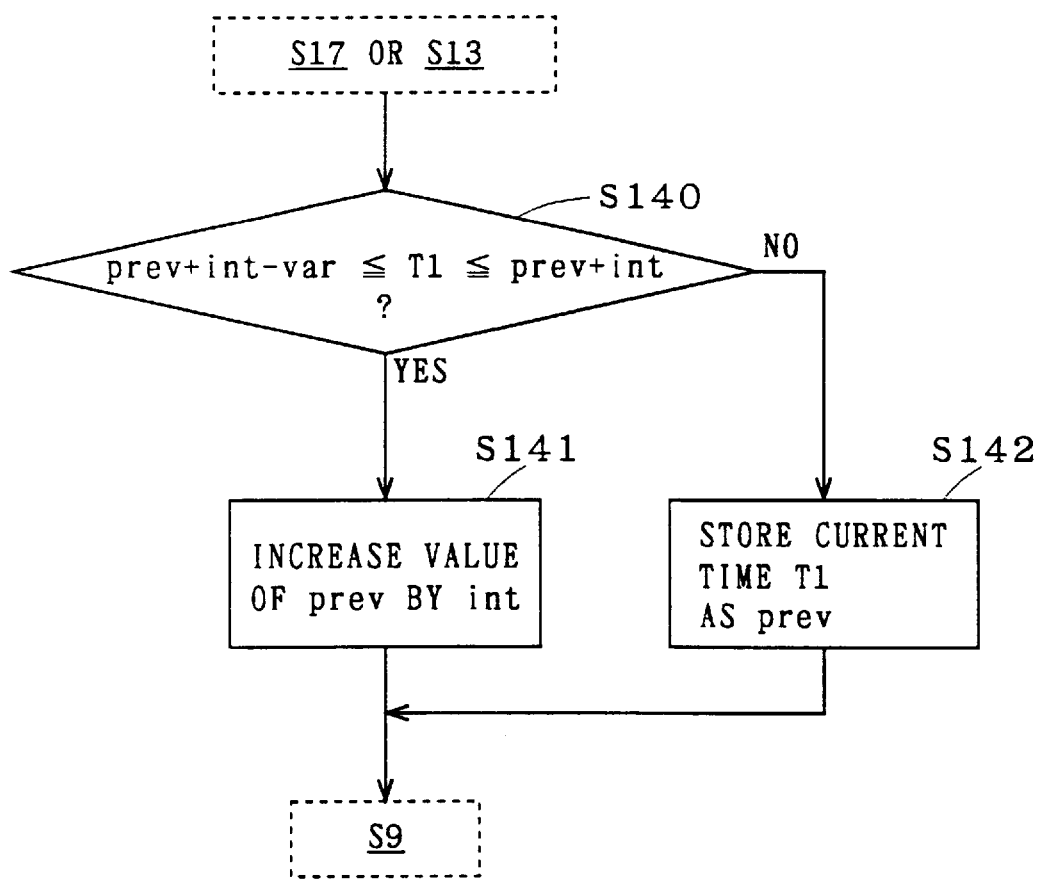
FIG. 18 is a flow chart showing the operation of the embodiment 5 of the present invention.
Figure 19:
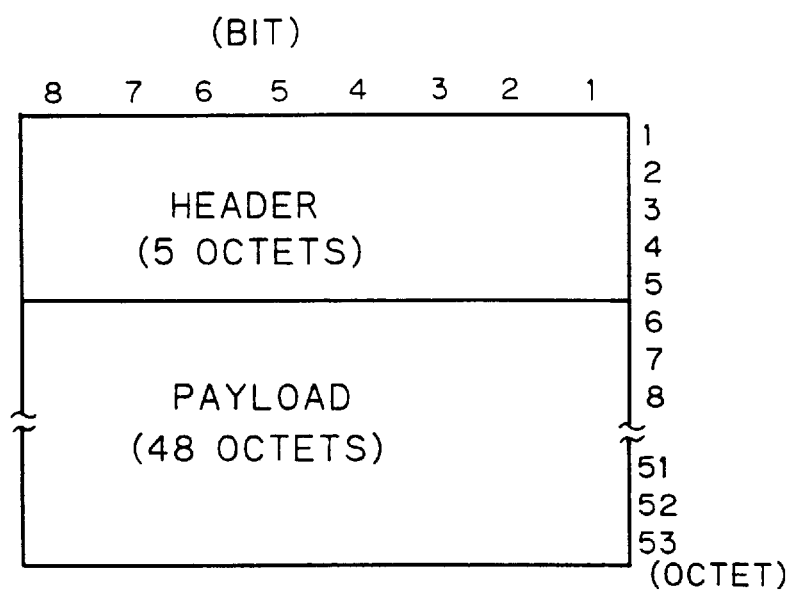
FIG. 19 is a conceptual diagram showing the format of a cell.

If the condition of the step S17 is relaxed in a case of document communication or the like, the changed content of the step S14 also differs, as described in relation to the embodiment 4. FIG. 18 is a flow chart showing processing substituting for the step S14 in this case, which can be performed as a the signal control part 1a in concrete example.

If int−var≦ΔT holds, a determination is made that normal transmission is performed in the connection, and hence a determination of YES is made at a step S140 when the cell #p is received after the time (prev+int−var) and before the time (prev+int), the time receiving the cell #p is virtually impartially assumed to be prev+int (=T0=int), and prev is updated with this value. Namely, the value of prev is increased by int (step S141). Thus, it is possible to detect that transmission of the cell #s is abnormal also when the cell #p is received after the cell #n in a short interval within the allowed range and the cell #s is received after the cell #p in an interval shorter than the allowable range (2int) for the cell #n.

If the cell #p is received after the time (prev+int), on the other hand, a determination of NO is made at the step S140 and prev is updated with the current time T1 receiving the cell #p, similarly to the step S14 (step S142). Even if prev is updated at the step S142, no such case that the cell #s is received after the cell #p in an interval shorter than the allowable range with respect to the cell #n is overlooked.

According to each of the embodiments 3 to 5, as hereinabove described, the function of UPC can be implemented by simply adding a small function to each of the embodiments 1 and 2 implementing RT. Further, this UPC can be performed as part of processing carried out in receiving of cells, whereby error processing can be immediately performed on an incorrect cell. Thus, influences on other correct connections can be suppressed to the minimum.

Particularly in the embodiments 4 and 5, int and var are set and hence UPC can be effectively executed also in consideration for allowable ranges for intervals between transmitted cells.

While the invention has been shown and described in detail, the foregoing description is in all aspects illustrative and not restrictive. It is therefore understood that numerous modifications and variations can be devised without departing from the scope of the invention.

What is claimed is:

1. An ATM protocol processing method, operating with a plurality of connections for transmitting cells obtained by disassembly of a frame, for conducting restoration of said frame by reassembly processing employing said cells, said method comprising steps of:

(a) being carried out every receiving of said cells, including a step of:

(a-1) storing a current time in a first parameter related to an unrestored connection not yet completing said restoration with said received cells among receiving connections which are connections for transmitting said received cells;

(b) being carried out every first cycle, including a step of:

(b-1) obtaining a first elapsed time by subtracting a value of said first parameter from the stored current time at least every said unrestored connection; and (c) comparing said first elapsed time with a second cycle which is longer than said first cycle.

2. The ATM protocol processing method in accordance with claim 1, wherein said step (a) further includes a step of:

(a-2) storing information indicating whether or not said restoration is completed with said received cells as a second parameter related to said receiving connections, and said step (b) further includes a step of:

(b-2) obtaining said second parameters of all said connections.

3. The ATM protocol processing method in accordance with claim 2, wherein said first and second parameters are stored in a same position in a memory every said connection.

4. The ATM protocol processing method in accordance with claim 3, wherein all said first parameters are also obtained in said step (b-1).

5. The ATM protocol processing method in accordance with claim 1, wherein a second parameter forming an information pair along with said first parameter every said connection is set, said second parameter of a first unrestored connection indicates a position of a storage region of said information pair of a second unrestored connection, whereby said information pairs are coupled with each other for forming a linked list, and said step (b-1) is executed along said linked list every said unrestored connection in said step (b).

6. The ATM protocol processing method in accordance with claim 5, wherein said step (a) further includes a step of:

(a-2) updating indicative information having indicated the storage region of said information pair of a new restored connection which is said receiving connection completing said restoration with said received cells, with said second parameter of said new restored connection.

7. The ATM protocol processing method in accordance with claim 6, wherein said indicative information is:

a head address indicating a head of said linked list when said information pair related to said new restored connection is the head of said linked list, or said second parameter of said information pair being coupled precedently to said information pair of said new restored connection in said linked list.

8. The ATM protocol processing method in accordance with claim 6, wherein said step (a) further includes a step of:

(a-3) conducting an addition of a new unrestored connection being said receiving connection newly becoming said unrestored connection to said linked list, for updating said second parameter of an information pair having been an end of said linked list precedently to said addition with the position of said information pair being related to said new unrestored connection.

9. The ATM protocol processing method in accordance with claim 1, further comprising a step of:

(c) being carried out every receiving of said cells, including steps of:

(c-1) reading said first parameter having been stored in relation to said receiving connections, (c-2) obtaining a second elapsed time by subtracting said first parameter from the stored current time, and (c-3) determining whether or not said second elapsed time is within a prescribed range, said step (a-1) being carried out after said step (c).

10. The ATM protocol processing method in accordance with claim 9, wherein said step (c-3) is adapted to determine whether or not said second elapsed time is larger than a minimum time being allowed for an interval between two said cells being adjacently transmitted in said receiving connections.

11. The ATM protocol processing method in accordance with claim 10, wherein said minimum time after a specific time is set while fluctuating in response to said interval between said cells being transmitted in advance of said specific time in said connections.

12. The ATM protocol processing method in accordance with claim 11, wherein said minimum time after said specific time is set to be wider than said interval between said cells being transmitted in advance of said specific time in said connections.

13. The ATM protocol processing method in accordance with claim 9, wherein a value of said first parameter is increased by an amount defining said prescribed range in place of storing the stored current time in said first parameter in said step (a-1) when said second elapsed time is determined as not being within said prescribed range at said step (c-3).

14. An ATM protocol processing apparatus, operating with a plurality of connections for transmitting cells obtained by disassembly of a frame, for conducting restoration of said frame by reassembly processing employing said cells, said ATM protocol processing apparatus comprising:

(a) a memory for storing first and second parameters every said connection;

(b) a clock device for supplying a current time;

(c) a timer for supplying a first cycle;

(d) a subtraction device for subtracting a value of said first parameter of a corresponding connection from the stored current time for obtaining an elapsed time every said connection when said restoration in said connection is not completed; and (e) a comparison device for comparing said elapsed time with a second cycle which is longer than said first cycle, wherein said first parameter is related to a receiving connection which is a connection transmitting received cells and is updated with the stored current time obtained from said clock device every receiving of said cells, and said second parameter is related to said receiving connection and is updated with information indicating whether or not said restoration is completed in said receiving connection every receiving of said cells.

15. The ATM protocol processing method in accordance with claim 14, wherein said memory stores said first and second parameters in a same address every said connection.

16. An ATM protocol processing apparatus, operating with a plurality of connections for transmitting cells obtained by disassembly of a frame, for conducting restoration of said frame by reassembly processing employing said cells, said ATM protocol processing apparatus comprising:

(a) a memory for storing first and second parameters every said connection;

(b) a clock device supplying a current time;

(c) a timer supplying a first cycle;

(d) storage means for storing head and end addresses of a linked list formed by unrestored connections which are connections not completing said restoration;

(e) a subtraction device for subtracting a value of said first parameter which is related to said unrestored connections from the stored current time for obtaining an elapsed time every said connection; and (f) a comparison device for comparing said elapsed time with a second cycle which is longer than said first cycle, wherein said first parameter is related to a receiving connection which is a connection transmitting received said cells and is updated every receiving of said cells with the stored current time being obtained from said clock device, said elapsed time is obtained along said linked list from said head address to said end address, and said linked list is formed by said second parameter of a first unrestored connection indicating a position of a region for storing information related to a second unrestored connection in said memory.

17. The ATM protocol processing method in accordance with claim 14, wherein said memory further stores a third parameter indicating a preferable receiving interval between said cells belonging to a same frame every said connection, said ATM protocol processing apparatus further comprising:

a second comparison device for comparing said elapsed time with said third parameter.

18. The ATM protocol processing method in accordance with claim 16, wherein said memory further stores a third parameter indicating a preferable receiving interval between said cells belonging the same said frame every said connection, said ATM protocol processing apparatus further comprising:

a second comparison device for comparing said elapsed time with said third parameter.

19. The ATM protocol processing apparatus in accordance with claim 14, wherein said memory further stores a third parameter indicating a preferable receiving interval of said cells belonging to a same frame every said connection, and a fourth parameter indicating an allowable range of said receiving interval, said ATM protocol processing apparatus further comprising:

a second comparison device for comparing said elapsed time with a difference between and a sum of said third and fourth parameters.

20. The ATM protocol processing apparatus in accordance with claim 16, wherein said memory further stores a third parameter indicating a preferable receiving interval of said cells belonging to a same frame every said connection, and a fourth parameter indicating an allowable range of said receiving interval, said ATM protocol processing apparatus further comprising:

a second comparison device for comparing said elapsed time with a difference between and a sum of said third and fourth parameters.

* * * * *